United States Patent
Qian et al.

(10) Patent No.: US 11,634,556 B2
(45) Date of Patent: Apr. 25, 2023

(54) METHOD FOR PREPARING ACCELERATOR FOR SPRAYED MORTAR/CONCRETE

(71) Applicant: JIANGSU ARIT NEW MATERIALS CO., LTD., Nanjing (CN)

(72) Inventors: Shanshan Qian, Beijing (CN); Ziming Wang, Beijing (CN); Suping Cui, Beijing (CN); Xiao Liu, Beijing (CN); Mingzhang Lan, Beijing (CN); Yali Wang, Beijing (CN)

(73) Assignee: JIANGSU ARIT NEW MATERIALS CO., LTD., Nanjing (CN)

( * ) Notice: Subject to any disclaimer, the term of this patent is extended or adjusted under 35 U.S.C. 154(b) by 100 days.

(21) Appl. No.: 17/165,952

(22) Filed: Feb. 3, 2021

(65) Prior Publication Data
US 2022/0169826 A1 Jun. 2, 2022

(30) Foreign Application Priority Data
Nov. 27, 2020 (CN) .......................... 202011356914.3

(51) Int. Cl.
*C08K 3/30* (2006.01)
*C08K 11/00* (2006.01)

(52) U.S. Cl.
CPC ................ *C08K 3/30* (2013.01); *C08K 11/00* (2013.01); *C08K 2003/3081* (2013.01)

(58) Field of Classification Search
CPC ............................................ C08K 2003/3081
See application file for complete search history.

(56) References Cited

U.S. PATENT DOCUMENTS 8,075,688 B2 12/2011 Weibel et al.
9,242,904 B2 1/2016 Bonin et al.

FOREIGN PATENT DOCUMENTS

| CN | 101475335 A | 7/2009 |
| CN | 108623741 A | 10/2018 |
| CN | 111377649 A | 7/2020 |
| EP | 0946451 B1 | 9/2000 |
| GB | 1099152 A | 1/1968 |

OTHER PUBLICATIONS

Machine translation of CN 111377649 (Year: 2020).*
GB/T 35159-2017, Flash setting admixtures for shotcrete, National Standard of The People's Republic Of China, 2017, pp. 1-16.

* cited by examiner

*Primary Examiner* — Wenwen Cai
(74) *Attorney, Agent, or Firm* — Muncy, Geissler, Olds & Lowe, P.C.

(57) ABSTRACT

A method for preparing an accelerator for sprayed mortar/concrete is provided. The accelerator includes an organic component, inorganic component aluminum sulfate, an initiator, and a reductant. The organic component in the form of a polymer monomer is added to concrete and polymerized into a polymer network structure in the presence of the initiator and the reductant; and the inorganic component aluminum sulfate promotes rapid hydration of the concrete to form an inorganic network structure. Such organic-inorganic interpenetrating network thickens a cement-based material rapidly to achieve strong adhesion, fast-setting and hardening properties and effectively reduces resilience of the sprayed mortar/concrete. The accelerator prepared by the method is well compatible with all sorts of cement, efficient and environmentally friendly. The organic-inorganic interpenetrating network is formed by polymerization and cement hydration, and therefore, the toughness of the sprayed mortar/concrete is improved by the organic polymer-inorganic compound accelerator.

8 Claims, No Drawings

METHOD FOR PREPARING ACCELERATOR FOR SPRAYED MORTAR/CONCRETE

CROSS REFERENCE TO THE RELATED APPLICATIONS

This application is based upon and claims priority to Chinese Patent Application No. 202011356914.3, filed on Nov. 27, 2020, the entire contents of which are herein incorporated by reference.

TECHNICAL FIELD

The present invention relates to the field of building materials, and in particular to a method for preparing an accelerator for sprayed mortar/concrete.

BACKGROUND

Sprayed mortar/concrete has been widely used in the fields of tunnel engineering, underground engineering, hydraulic tunnels, slope protection support, water conservancy and hydropower, mine tunnels, and repairing works. An accelerator used therein is an alkali-free (low-alkali) accelerator, represented by aluminum sulfate type. The accelerator has the advantages of a low 28-day strength loss, is alkali-free, chloride-free, safe, environmentally friendly, and has a high durability. However, there are still problems to be solved, such as high dosage, unstable compatibility with concrete and other admixtures and working environments, an unsteady setting time, and large rebound loss.

In the prior art, European Patent No. EP0946451B1 entitled "SOLIDIFYING AND HARDENING ACCELERATOR FOR HYDRAULIC BINDERS" discloses an aqueous accelerator mainly composed of aluminum hydroxide, aluminum salts, and organic carboxylic acids, which can be easily mixed with concrete. The accelerator, however, is unstable in solution. U.S. Pat. No. 8,075,688B2 entitled "AQUEOUS ACCELERATOR MIXTURE" discloses an aqueous accelerator using alumina, sulfuric acid, fluoride, magnesium silicate, or kaolin as a stabilizer. Magnesium silicate or kaolin is used for water expansion to increase the system viscosity to stabilize the solution system, achieving excellent dispersion in concrete and promoting setting. U.S. Pat. No. 9,242,904B2 entitled "AQUEOUS PREPARATIONS OF POLYMER-MODIFIED SETTING ACCELERATORS, AND USE THEREOF IN THE CONSTRUCTION INDUSTRY" discloses a setting accelerator of aluminum salts, aluminates, or alkali metal silicates modified by various forms (liquid, solid or powder) of polymer vinyl acetate or copolymers thereof. The polymer vinyl acetate increases the system viscosity so that a plurality of polymers and components of the setting accelerator exist in a solution stably and simultaneously.

The present invention integrates a polymer monomer into a cement paste and enables polymerization in and between polymer monomer molecules to form a network structure in the presence of the initiator and the reductant, which makes the concrete/mortar more tacky to increase the viscosity of the sprayed mortar/concrete, reduce rebound loss, prevent the mortar/concrete from falling off due to gravity, and increase spraying thickness at one time and shorten the interval time between spraying layers. Moreover, the polymer monomer has nitrogen and hydroxyl groups, similar to an alkylol amine structure, which can accelerate cement hydration and shorten initial setting time. Since water is added, the cement begins to hydrate continuously to form abundant crystals and colloidal hydration products, and forms an organic-inorganic composite network structure together with the polymer monomer, improving the binding between interfaces of the hydration products and increasing flexural strength. The accelerator of the present invention is well compatible with a water reducer and has no unfavorable effect on 28 d strength of concrete.

SUMMARY

1. Technical Problems to be Solved

In view of the above technical problems, the present invention provides a method for preparing an accelerator for sprayed mortar/concrete. The accelerator prepared by the method is efficient, environmentally friendly, and well compatible with all sorts of concretes. The accelerator and the concrete can be polymerized to form an organic-inorganic interpenetrating network, and therefore, an organic polymer accelerator capable of improving toughness of sprayed concrete is formed.

2. Technical Solution

A method for preparing an accelerator for sprayed mortar/concrete is provided. The accelerator includes an organic component, inorganic component aluminum sulfate, an initiator, and a reductant. The organic component in the form of a polymer monomer is added to concrete and polymerized into a polymer network structure in the presence of the initiator and the reductant. The inorganic component aluminum sulfate promotes rapid hydration and hardening of the concrete to form an organic-inorganic interpenetrating network that thickens a cement-based material rapidly to achieve strong adhesion and fast-setting properties and reduces rebound loss of the sprayed mortar/concrete.

Further, the accelerator may include the following specific components:
40-45 parts by weight of aluminum sulfate,
5-10 parts by weight of a polymer monomer,
0.5-1.2 parts by weight of an initiator,
0.2-0.5 parts by weight of a reductant.

Further, a method for synthesizing the polymer monomer may be to conduct amine-epoxide ring-opening polymerization on a diepoxy organic matter with a structural formula of $R_1[CH(O)CH_2]_2$ and a primary amine with a structural formula of $R_2NH_2$ to obtain the polymer monomer. The polymer monomer includes a plurality of alkenyls and has a structural formula of

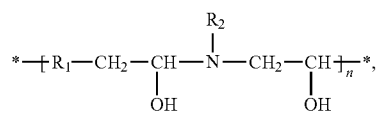

where $R_1$ is an alkylene, an ether or a phenyl derivative, $R_2$ is an unsaturated olefin group, and $n \geq 2$. Nitrogen and hydroxyl groups are contained in the molecular structure of the polymer monomer, which is similar to an alkylol amine structure, showing an early strength.

Further, the polymer monomer may have a weight average molecular weight of 400-5,000 g/mol.

Further, the diepoxy organic matter may be at least one selected from the group consisting of 1,3-diglycidyl glyceryl ether, 1,3-butadiene diepoxide, diepoxy-(+)-1,3-butadiene- D6, 1,2-bis(4-(oxiran-2-ylmethoxy)diphenyl sulfone, bis(glycidoxypropyl)dibenzene, 2-[2-(oxiran-2-yl)ethyl]oxirane, glycerol diglycidyl ether, diglycidyl ether, 1,4-butanediol diglycidyl ether, ethylene glycol diglycidyl ether, and neopentyl glycol-1,4-butanediol diglycidyl ether.

Further, the primary amine may be at least one selected from the group consisting of allylamine, 4-aminostyrene, 3-aminostyrene, 3,3-Dimethylallylamine, but-3-en-1-amine, and 4-penten-1-amine.

Further, the initiator may be at least one selected from the group consisting of sodium persulfate and potassium persulfate.

Further, the reductant may be N,N,N',N'-tetramethylethylenediamine.

Further, the initiator and the reductant may be an alkali-resistant redox complex initiation system.

3. Advantages

The method for preparing an accelerator for sprayed mortar/concrete provided by the present invention integrates a polymer monomer into a cement paste, and conducts polymerization to form a polymer network structure in the presence of an initiator and a reductant. The inorganic component enables the concrete to rapidly hydrate into an inorganic network structure, and the above organic-inorganic interpenetrating network shortens the initial setting time of the concrete. At the late stage, nitrogen and active group —OH in an organic matter can conduct hydrogen-bonding and complexation with $Ca^{2+}$, $Mg^{2+}$, and $Al^{3+}$ from hydration products of the concrete; chemical bonding between the organic matter and the multivalent cations and crosslinked network of the organic matter per se interpenetrate to each other to improve the binding between interfaces and increase flexural strength. At the interfacial transition stage, polymer film is filled around the hydration products and on the aggregate surface, which enhances the binding between hydration products and between the cement paste and the aggregate interface zone and fills pores, with an enhancement effect.

DETAILED DESCRIPTION OF THE EMBODIMENTS

A method for preparing an accelerator for sprayed mortar/concrete is provided. The accelerator includes an organic component, an inorganic component aluminum sulfate, an initiator, and a reductant. The organic component in the form of a polymer monomer is added to concrete and polymerized into a polymer network structure in the presence of the initiator and the reductant. The inorganic component aluminum sulfate promotes rapid hydration and hardening of the concrete to form an organic-inorganic interpenetrating network that thickens a cement-based material rapidly to achieve strong adhesion and fast-setting properties and reduces rebound loss of the sprayed mortar/concrete.

Further, the accelerator may include the following specific components:
  40-45 parts by weight of aluminum sulfate,
  5-10 parts by weight of a polymer monomer,
  0.5-1.2 parts by weight of an initiator,
  0.2-0.5 parts by weight of a reductant.

Further, a method for synthesizing the polymer monomer may be to conduct amine-epoxide ring-opening polymerization on a diepoxy organic matter with a structural formula of $R_1[CH(O)CH_2]_2$ and a primary amine with a structural formula of $R_2NH_2$ to obtain the polymer monomer. The polymer monomer includes a plurality of alkenyls and has a structural formula of

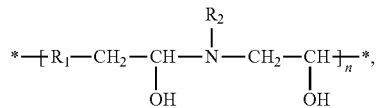

where $R_1$ is an alkylene, an ether or a phenyl derivative, $R_2$ is an unsaturated olefin group, and $n \geq 2$. Nitrogen and hydroxyl groups are contained in the molecular structure of the polymer monomer, which is similar to an alkylol amine structure, showing an early strength.

Further, the polymer monomer may have a weight average molecular weight of 400-5,000 g/mol.

Further, the diepoxy organic matter may be at least one selected from the group consisting of 1,3-diglycidyl glyceryl ether, 1,3-butadiene diepoxide, diepoxy-(+)-1,3-butadiene-D6, 1,2-bis(4-(oxiran-2-ylmethoxy)diphenyl sulfone, bis(glycidoxypropyl)dibenzene, 2-[2-(oxiran-2-yl)ethyl]oxirane, glycerol diglycidyl ether, diglycidyl ether, 1,4-butanediol diglycidyl ether, ethylene glycol diglycidyl ether, and neopentyl glycol-1,4-butanediol diglycidyl ether.

Further, the primary amine may be at least one selected from the group consisting of allylamine, 4-aminostyrene, 3-aminostyrene, 3,3-Dimethylallylamine, but-3-en-1-amine, and 4-penten-1-amine.

Further, the initiator may be at least one selected from the group consisting of sodium persulfate and potassium persulfate.

Further, the reductant may be N,N,N',N'-tetramethylethylenediamine.

Further, the initiator and the reductant may be an alkali-resistant redox complex initiation system.

Embodiment 1

An accelerator for sprayed mortar/concrete was prepared with the following components:
  45 parts by weight of aluminum sulfate,
  10 parts by weight of a polymer monomer,
  1.4 parts by weight of potassium persulfate, and
  0.5 parts by weight of N,N,N',N'-tetramethylethylenediamine.

The polymer monomer had a structural formula of

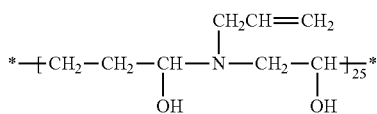

and a weight average molecular weight of 3,000 g/mol.

Embodiment 2

An accelerator for sprayed mortar/concrete was prepared with the following components:
  40 parts by weight of aluminum sulfate,
  5 parts by weight of a polymer monomer,
  1.2 parts by weight of potassium persulfate, and
  0.5 parts by weight of N,N,N',N'-tetramethylethylenediamine.

The polymer monomer had a structural formula of

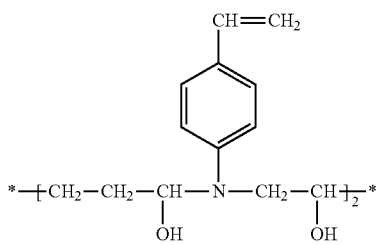

and a weight average molecular weight of 400 g/mol.

Embodiment 3

An accelerator for sprayed mortar/concrete was prepared with the following components:
45 parts by weight of aluminum sulfate,
8 parts by weight of a polymer monomer,
0.8 parts by weight of potassium persulfate, and
0.5 parts by weight of N,N,N',N'-tetramethylethylenediamine.

The polymer monomer had a structural formula of

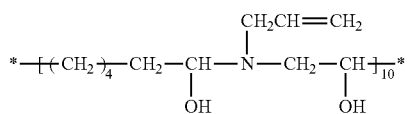

and a weight average molecular weight of 5,000 g/mol.

Performance Testing:

Reference cement was used, and main compositions of the reference cement are listed in Table 1. In accordance with GBT 35159-2017, setting time, flexural strength, and compressive strength were tested on Embodiments 1, 2, and 3.

TABLE 1

Chemical and mineral compositions of reference cement

Mass fraction w/ %

| $SiO_2$ | $A_2O_3$ | $F_2O_3$ | CaO | MgO | $SO_3$ | $Na_2Oeq$ | f-CaO | $C_3S$ | $C_2S$ | $C_3A$ | $C_4AF$ |
|---|---|---|---|---|---|---|---|---|---|---|---|
| 22.91 | 4.29 | 2.89 | 66.23 | 1.93 | 0.34 | 0.71 | 0.63 | 58.68 | 21.48 | 6.49 | 8.79 |

Setting Time Test:

400 g of concrete and 16 g of 4% accelerator were poured into an agitator kettle of a cement paste mixer; the mixer was started to agitate for 10 s at low speed and then paused; subsequently, 140 g of water was added at one time, and the mixture was agitated at low speed for 5 s and at high speed for 15 s; after the agitation is stopped, the mixture was filled in a master stamper immediately, inserted and beaten with a knife, and shaken gently a plurality of times; redundant paste was scraped off, and the surface was trowelled; since water addition, all operations did not exceed 50 s. Setting time test was conducted.

Flexural Strength Test and Compressive Strength Test:

900 g of concrete and 36 g of 4% accelerator were poured into an agitator kettle; a mixer was started to agitate for 30 s at low speed until mixed well; in a second process of 30-second low-speed agitation, 1,350 g of standard sand and 450 g of water were added evenly and agitated for 5 s at low speed and 15 s at high speed; the agitation was ended. The mortar obtained was charged into a cement mortar mold as soon as possible, and subsequent flexural strength test and compressive strength test were conducted.

1. Setting Time Test:

The accelerators prepared in Embodiments 1, 2, and 3 were added and subjected to the setting time test. Results are shown in Table 2. The experimental results proved that all of the accelerators prepared in embodiments met the Chinese national standard.

TABLE 2

Effects of accelerators on setting time of reference cement

| Sample | Dosage (%) | Initial setting time (min:second) | Final setting time (min:second) |
|---|---|---|---|
| 1 | 4.0 | 2:10 | 6:40 |
| 2 |  | 1:50 | 7:00 |
| 3 |  | 1:55 | 5:50 |

2. Flexural Strength Test:

The accelerators prepared in Embodiments 1, 2, and 3 were added and subjected to the mortar flexural strength test. Results are shown in Table 3. The experimental results proved that all of the accelerators prepared in embodiments improved early and 28 d flexural strengths.

TABLE 3

Mortar flexural strength test

| | | Percent flexural strength (%) | | |
|---|---|---|---|---|
| Accelerator | Dosage (%) | 1 d | 7 d | 28 d |
| None | 0 | 100 | 100 | 100 |
| 1 | 4.0 | 152 | 156 | 168 |

TABLE 3-continued

Mortar flexural strength test

| | | Percent flexural strength (%) | | |
|---|---|---|---|---|
| Accelerator | Dosage (%) | 1 d | 7 d | 28 d |
| 2 | | 165 | 161 | 173 |
| 3 | | 163 | 165 | 175 |

3. Compressive Strength Test:

The accelerators prepared in Embodiments 1, 2, and 3 and control sample Tianjin™ accelerator were added and subjected to the compressive strength test. Results are shown in Table 4. The experimental results proved that: there was no decrease in 28 d strength when using the accelerators; all the three accelerators prepared in embodiments met the Chinese national standard, and had better retention rate before 28 d than the Tianjin™ accelerator.

TABLE 4

Mortar compressive strength test

| Accelerator | Dosage (%) | Percent compressive strength (%) | | |
|---|---|---|---|---|
| | | 1 d | 7 d | 28 d |
| None | 0 | 100 | 100 | 100 |
| 1 | 4.0 | 113 | 103.2 | 101.3 |
| 2 | | 118 | 104 | 101.5 |
| 3 | | 116 | 106 | 102.5 |
| Tianjin ™ | | 107 | 90.2 | 87 |

Although the present invention has been described as above in the preferred embodiments, they are not intended to limit the present invention. Various alterations or modifications can be made by those skilled in the art without departing from the spirit and scope of the present invention. Therefore, the protection scope of the present invention should be subject to the protection scope defined by the claims of the present application.

What is claimed is:

1. A method for preparing an accelerator for sprayed mortar/concrete, comprising:

obtaining a polymer monomer by conducting an amine-epoxide ring-opening polymerization on a diepoxy organic matter with a structural formula of $R_1[CH(O)CH_2]_2$ and a primary amine with a structural formula of $R_2NH_2$, wherein the polymer monomer comprises a plurality of alkenyls and has a structural formula of

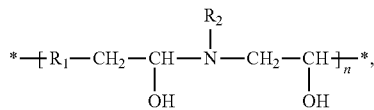

wherein $R_1$ is an alkylene, an ether or a phenyl derivative, $R_2$ is an unsaturated olefin group, and $n \geq 2$; and combining aluminum sulfate, the polymer monomer, an initiator and a reductant to form the accelerator, wherein the accelerator comprises:
40-45 parts by weight of the aluminum sulfate;
5-10 parts by weight of the polymer monomer;
0.5-1.2 parts by weight of the initiator; and
0.2-0.5 parts by weight of the reductant.

2. The method for preparing the accelerator for the sprayed mortar/concrete according to claim 1, wherein the polymer monomer has a weight average molecular weight of 400-5,000 g/mol.

3. The method for preparing the accelerator for the sprayed mortar/concrete according to claim 1, wherein the diepoxy organic matter is at least one selected from the group consisting of 1,3-diglycidyl glyceryl ether, 1,3-butadiene diepoxide, diepoxy-(+)-1,3-butadiene-D6, 1,2-bis(4-(oxiran-2-ylmethoxy)diphenylsulfone, bis(glycidoxypropyl)dibenzene, 2-[2-(oxiran-2-yl)ethyl]oxirane, glycerol diglycidyl ether, diglycidyl ether, 1,4-butanediol diglycidyl ether, ethylene glycol diglycidyl ether, and neopentyl glycol-1,4-butanediol diglycidyl ether.

4. The method for preparing the accelerator for the sprayed mortar/concrete according to claim 1, wherein the primary amine is at least one selected from the group consisting of allylamine, 4-aminostyrene, 3-aminostyrene, 3,3-Dimethylallylamine, but-3-en-1-amine, and 4-penten-1-amine.

5. The method for preparing the accelerator for the sprayed mortar/concrete according to claim 1, wherein the initiator is at least one selected from the group consisting of sodium persulfate and potassium persulfate.

6. The method for preparing the accelerator for the sprayed mortar/concrete according to claim 1, wherein the reductant is N,N,N',N'-tetramethylethylenediamine.

7. The method for preparing the accelerator for the sprayed mortar/concrete according to claim 1, wherein the initiator and the reductant are an alkali-resistant redox complex initiation system.

8. A method of using the accelerator of claim 1 for sprayed motar/concrete, comprising adding the accelerator to the mortar/concrete, wherein the polymer monomer polymerizes and forms a polymer network structure in the presence of the initiator and the reductant, and the aluminum sulfate promotes rapid hydration of the mortar/concrete to form an organic-inorganic interpenetrating network to thicken the mortar/concrete rapidly to achieve strong adhesion and fast-setting properties and reduce resilience of the mortar/concrete.

* * * * *